Sept. 28, 1937.  H. W. SHANNON  2,094,419
FISHING TOOL
Filed Sept. 28, 1936
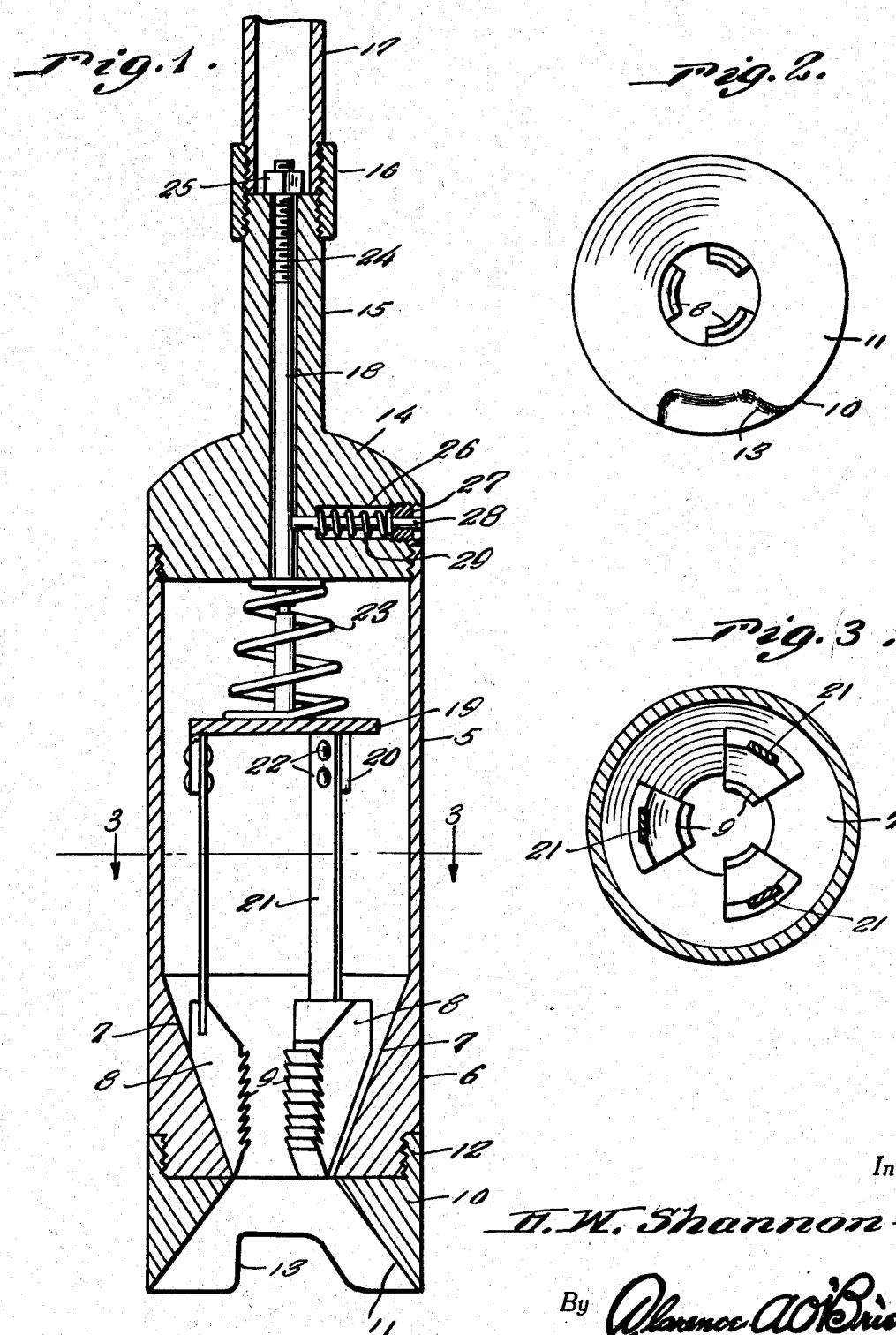
Inventor
H. W. Shannon
By Clarence A. O'Brien
Hyman Berman
Attorneys Patented Sept. 28, 1937

2,094,419

UNITED STATES PATENT OFFICE 2,094,419

FISHING TOOL

Henry W. Shannon, Osage, Okla.

Application September 28, 1936, Serial No. 103,028

1 Claim. (Cl. 294—99)

This invention appertains to new and useful improvements in fishing tools whereby the tool and tubing attached thereto can be removed in the event the lost tubing gets hung up in the well in such a manner that it cannot be removed by the fishing tool.

Another important object of the invention is to provide a fishing tool which is simple of construction, positive acting in use and not susceptible to the ready development of defects.

These and various other important objects and advantages of the invention will become apparent to the reader of the following specification.

In the drawing:

Figure 1 is a view in vertical section of my improved tool,

Figure 2 is a bottom plan view of the tool and

Figure 3 is a transverse sectional view taken on the line 3—3 of Figure 1.

Referring to the drawing wherein like numerals designate like parts it can be seen that numeral 5 represents the shell of the tool which is thickened at its lower portion as at 6 to provide the inclined slide surfaces 7 against which the tubing slips 8 are slidable. These slips are provided with ratchet teeth 9 adapted to bite into a well tubing which has been received through the opening in the bottom of the shell 5. Numeral 10 represents a cylindrical shoe provided with an inwardly tapering opening 11 therein and this is provided with an internally upstanding wall 12 for engagement over the threaded lower portion of the shell 5. This shoe is exchangeable for other shoes and is provided with a cutout 13 in the side thereof to facilitate engagement over a well tubing.

The head 14 of the tool is provided with a threaded portion for receiving the upper internally threaded end of the shell 5 and a neck 15 extends upwardly from the head 14 and is provided with a threaded upper end for engagement into a portion of the coupling sleeve 16 which connects the neck 15 to the tool tubing 17.

The rod 18 is vertically slidable through the neck 15 and head 14 and has the carrier plate 19 at its lower end from which depend the leg members 20 to which the shanks 21 of the slips 8 are secured as at 22. A coiled compressible spring 23 circumscribes the rod 18 and is interposed between the head 14 and the plate 19.

The upper end of the rod 18 is threaded as at 24 so as to accommodate the nut 25. A radial bore 26 is provided in the head 14 and is internally threaded to receive the nut 27. A rod 28 is slidable through the nut 27 and can engage with the rod 18. The rod 28 locks the rod 18 against turning. Numeral 29 represents a spring interposed between a collar on the rod 28 and the inner end of the bore 26.

In the operation of the device, it can be seen that the tool can be lowered over a lost tube and the slips 8 engaged with said tube. However, should the tube be hung in the well so that it cannot be removed by the tool the latter can be readily disconnected by lowering a suitable socket wrench through the tubing 17 and screwing the nut 25 downwardly on the rod 18 so as to lift the slips 8 and permit disengagement thereof from the lost tubing.

While the foregoing specification sets forth the invention in specific terms, it is to be understood that numerous changes in the shape, size and materials may be resorted to without departing from the spirit and scope of the invention as claimed hereinafter.

Having described the invention, what is claimed is:—

A fishing tool of the class described comprising a shell having a downwardly converging slideway in the lower end thereof, a head at the upper end of said shell provided with a central upstanding sleeve, a rod passing through said sleeve and the head into the said shell and tensioned for movement inwardly of said sleeve, head and shell, a plurality of slips suspended from the inner end of said rod for cooperation with said slideway, a nut threaded onto the outer end of said rod and seating on the outer end of said sleeve for manipulation against said sleeve to raise said rod and thereby raise said slips away from said slideway, and a tube connected to the outer end of said sleeve for the insertion of a wrench therethrough into engagement with said nut.

HENRY W. SHANNON.